J. R. HIPSLEY.
NUT LOCK.
APPLICATION FILED MAR. 29, 1913.
1,081,741.
Patented Dec. 16, 1913.
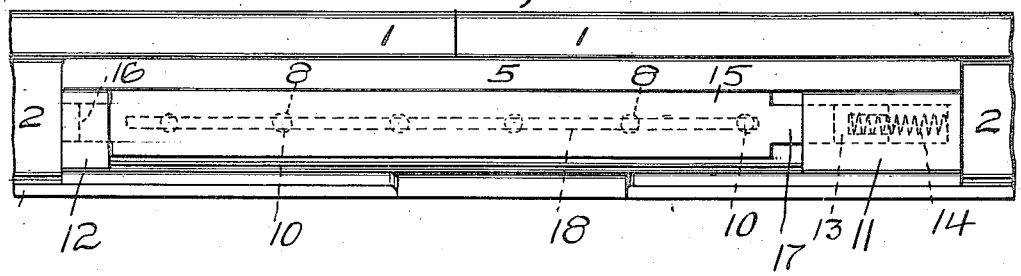
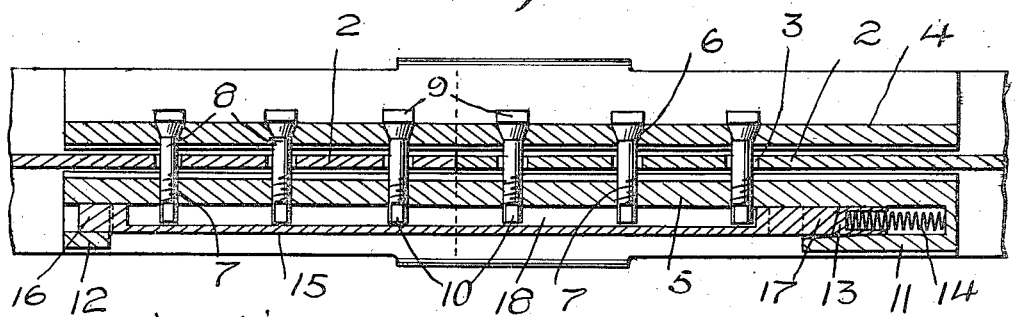
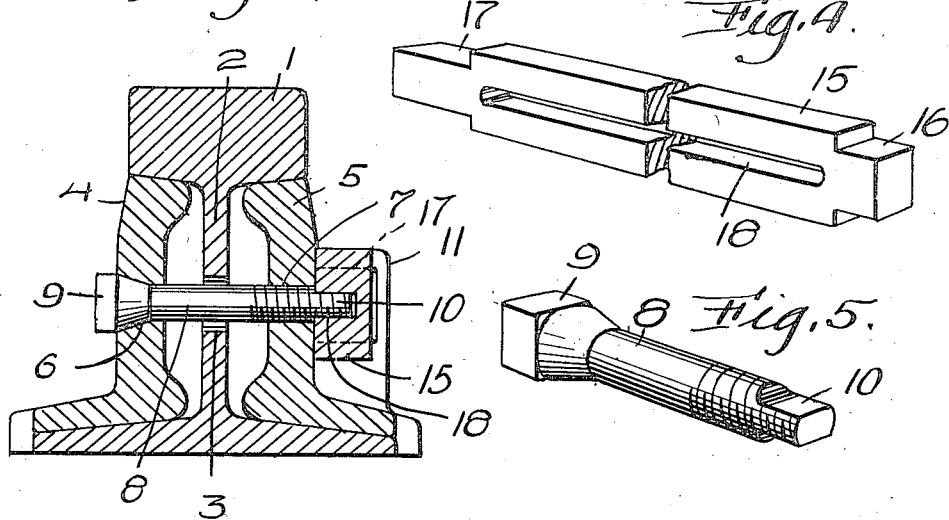
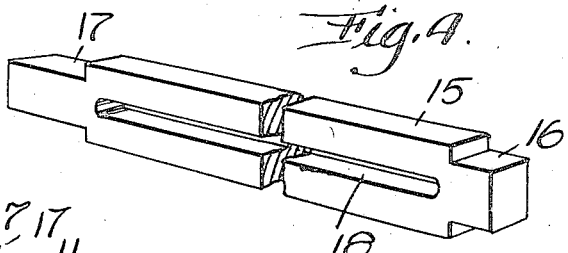
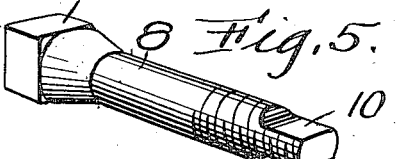
WITNESSES
Samuel Payne
Karl H. Butler
INVENTOR
J. R. HIPSLEY.
By Henry C. Evert
ATTORNEYS

UNITED STATES PATENT OFFICE.

JOHN R. HIPSLEY, OF MOUNTAIN LAKE PARK, MARYLAND.

NUT-LOCK.

1,081,741.　　　　　Specification of Letters Patent.　　Patented Dec. 16, 1913.

Application filed March 29, 1913. Serial No. 757,533.

*To all whom it may concern:*

Be it known that I, JOHN R. HIPSLEY, a citizen of the United States of America, residing at Mountain Lake Park, in the county of Garrett and State of Maryland, have invented certain new and useful Improvements in Nut-Locks, of which the following is a specification, reference being had therein to the accompanying drawing.

This invention relates to nut locks, and the primary object of my invention is the provision of positive and reliable means, as hereinafter set forth, for connecting splice bars to the sides of rails, whereby the rails cannot become vertically or laterally displaced.

Another object of this invention is to provide a fastener for splice bars wherein screws and a locking bar common to all of said screws is utilized for preventing the screws from rotating after having been placed in position.

A further object of this invention is to provide a rail joint that is easy to install, durable, and highly efficient for the purposes for which it is intended.

With the above and other objects in view the invention resides in the novel construction, combination and arrangement of parts to be hereinafter specifically described and then claimed.

Reference will now be had to the drawing, wherein:—

Figure 1 is a side elevation of a rail joint showing the adaptation therewith of a nut lock in accordance with this invention, Fig. 2 is a horizontal sectional view of the same, Fig. 3 is an enlarged cross sectional view of the joint, Fig. 4 is a perspective view of a portion of a detached locking bar, and Fig. 5 is a perspective view of a screw.

Further describing my invention in detail with reference to the accompanying drawing, wherein like numerals denote corresponding parts throughout: 1 denotes the confronting or abutting ends of rails that have the webs 2 thereof provided with openings 3.

4 and 5 denote splice bars and these bars brace the side of the rails and have transverse openings 6 and 7 alining with the openings 3 of the webs 2. The walls of the openings 7 are screw threaded and the openings 6, 3 and 7 receive screws 8, said screws having conical heads 9 engaging in the outer sides of the splice bar 4 and the threaded ends thereof provided with shanks 10 that protrude from the outer side of the splice bar 5, after the screws have been screwed into the openings 7. The walls at the outer ends of the openings 6 are tapered to receive the conical heads 9 whereby should the head be sheared or broken, the screws 8 will still remain in place.

11 and 12 denote housings carried by the outer sides of the splice bar 5, at the ends thereof. Arranged in the housing 11 is a spring pressed block 13, said block being held normally in an extended position by a coiled compression spring 14 arranged in the inner end of the housing.

15 denotes a locking bar having reduced ends 16 and 17. The bar is provided with a longitudinal slot 18 to receive the shanks 10, and to place said bar in position, the end 17 thereof is placed in the housing 11, against the block 13 and then shifted longitudinally of the splice bar 5, whereby the end 16 of said locking bar can be placed in position to enter the housing 12 when the bar is released. The spring pressed block 13 retains the end 16 of the locking bar in the housing 12 and said bar cannot become accidentally displaced and can only be removed when manually shifted.

While in the drawing, there is illustrated a preferred embodiment of the invention it is to be understood that the structural elements are susceptible of such variations and modifications as fall within the scope of the appended claims.

What I claim is:—

1. The combination with a plurality of parallel elements, of a plurality of bolts extending through said parallel elements, said bolts having shanks projecting therefrom, a locking bar provided with a longitudinal groove into which extend said shanks, a support for each end of said locking bar, and a spring pressed block mounted in one of said supports, engaging one end of said bar and providing means for holding said bar in engagement with the other of said supports.

2. The combination with a plurality of parallel elements, of a bolt extending transversely through said elements and having its threaded portion screwing in one of said elements, said bolt further provided with a shank projecting from its threaded portion, a grooved locking bar mounted upon said shank, a support for each end of said bar, and a spring pressed block mounted in one of said supports engaging one end of said bar and constituting means for maintaining said bar in engagement with the other of said supports.

3. In combination, a plurality of parallel elements, a bolt extending transversely of said parallel elements and further having its threaded portion screwed into one of said elements, said bolt provided with a reduced flattened shank projecting from its threaded portion, a grooved locking bar mounted upon said shank, a support for each end of said locking bar, and a spring pressed block arranged in one of said supports and engaging one end of said bar and constituting means for maintaining said bar in engagement with the other of said supports.

4. In combination, a plurality of parallel elements, a bolt extending transversely through said elements and having its threaded portion screwing into one of said elements, said bolt provided with a reduced shank projecting from its threaded portion, said shank having flat parallel faces, a grooved locking bar mounted upon said shank, the flat faces of said shank opposing the top and bottom walls of said groove, said bar having its ends reduced, a support for each of the reduced ends of the bar, and a spring pressed block mounted in one of said supports, engaging one reduced end of said bar and constituting means for maintaining the reduced end in the housing in the other of said supports with the body of the bar in abutting engagement with the said support.

In testimony whereof I affix my signature in the presence of two witnesses.

JOHN R. HIPSLEY.

Witnesses:
    JNO. D. HAYDEN,
    HERBERT LEIGHTON.